(12) United States Patent
Miller et al.

(10) Patent No.: US 8,844,108 B2
(45) Date of Patent: Sep. 30, 2014

(54) LARGE AREA REPAIR OF COMPOSITE AIRCRAFT

(75) Inventors: Jeffrey L. Miller, Mukilteo, WA (US); Scott M. Spencer, Everett, WA (US); Gary D. Oakes, Renton, WA (US); Stephen J. Dostert, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 13/267,872

(22) Filed: Oct. 6, 2011

(65) Prior Publication Data

US 2013/0014367 A1 Jan. 17, 2013

Related U.S. Application Data

(60) Provisional application No. 61/507,115, filed on Jul. 12, 2011.

(51) Int. Cl.
*B23P 6/00* (2006.01)
*B64F 5/00* (2006.01)

(52) U.S. Cl.
CPC .................................... *B64F 5/0081* (2013.01)
USPC ...................................................... 29/402.08

(58) Field of Classification Search
CPC ............ B23P 6/00; B21J 15/142; B64C 3/26; B64C 2700/6233; B64C 3/20; B64C 5/0045; B64C 5/0081; B64C 1/12; F16B 5/0208; Y02T 504/33; B29D 99/0089; B29C 39/00

USPC ............... 29/402.08, 402.01, 402.03, 402.09, 29/402.11, 402.14, 402.15, 402.18, 29/407.04, 407.05, 426.1, 428, 458, 505, 29/525.01, 535.05, 525.12; 156/292; 264/259; 244/2, 123.1, 126
See application file for complete search history.

(56) References Cited

U.S. PATENT DOCUMENTS

| | | | | |
|---|---|---|---|---|
| 3,141,487 A | * | 7/1964 | Boyd | ............................. 411/105 |
| 5,074,948 A | | 12/1991 | Greffioz et al. | |
| 6,168,358 B1 | | 1/2001 | Engwall et al. | |
| 6,643,615 B1 | | 11/2003 | Bauer et al. | |
| 6,928,396 B2 | | 8/2005 | Thackston | |
| 7,080,441 B2 | | 7/2006 | Braun | |
| 7,097,131 B2 | * | 8/2006 | Palmer et al. | .................. 244/1 A |
| 7,282,107 B2 | | 10/2007 | Johnson et al. | |
| 7,459,048 B2 | | 12/2008 | Pham et al. | |
| 7,913,390 B2 | | 3/2011 | Masters et al. | |
| 7,935,289 B2 | | 5/2011 | Anderson | |
| 7,963,039 B2 | | 6/2011 | Burnett et al. | |
| 7,968,021 B2 | | 6/2011 | Cleary, Jr. et al. | |

* cited by examiner

*Primary Examiner* — John C Hong
(74) *Attorney, Agent, or Firm* — Hugh P. Gortler

(57) ABSTRACT

A randomly damaged area of a one-piece composite component of an aircraft is repaired according to a method herein. The damaged area covers skin and underlying stiffening substructure of the component. The method includes generating a design of a customized composite replacement panel for replacing the damaged area. The design includes replacement skin and underlying co-cured replacement stiffening substructure. The method further includes fabricating the composite replacement panel according to the design.

30 Claims, 12 Drawing Sheets

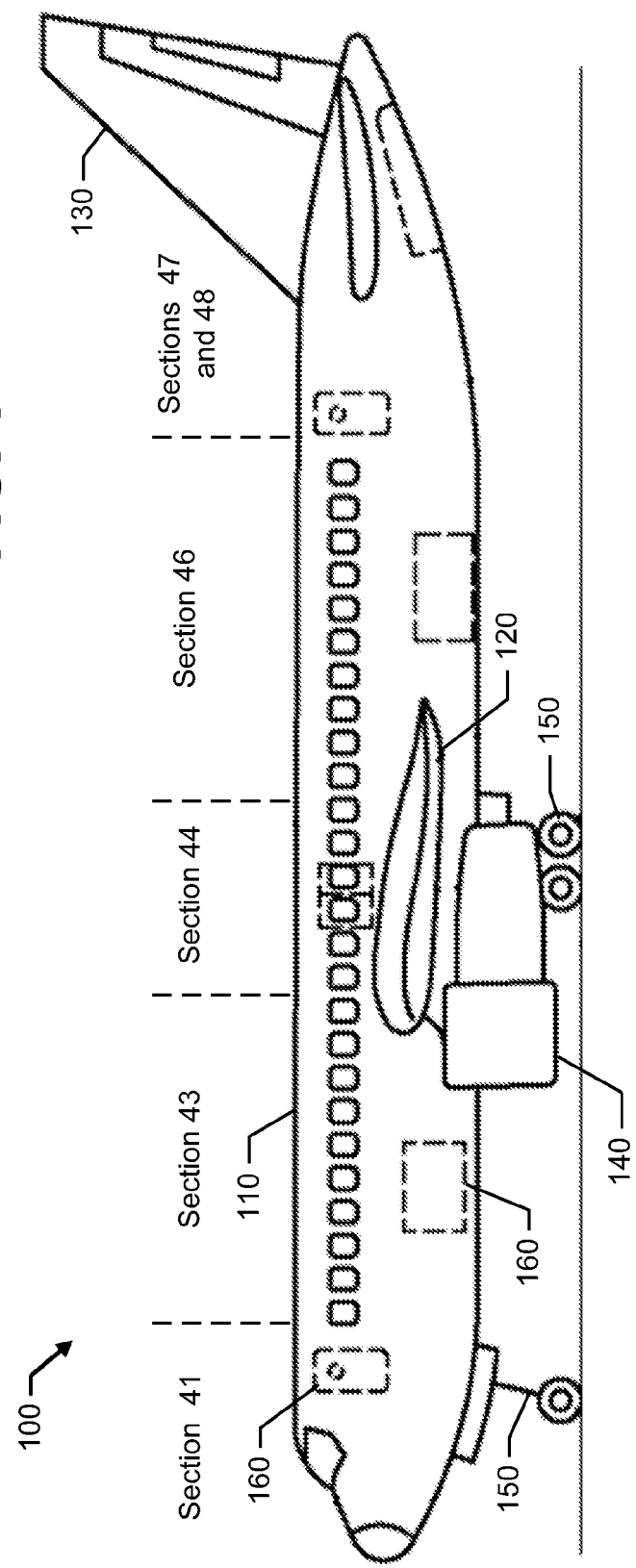

FIG. 2A
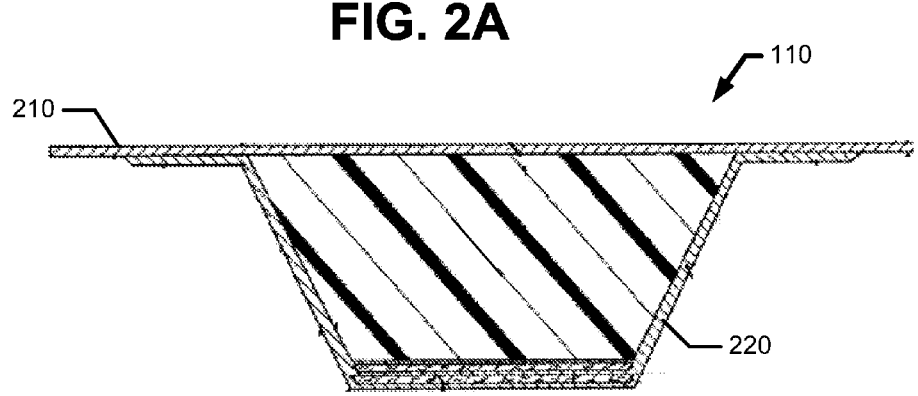
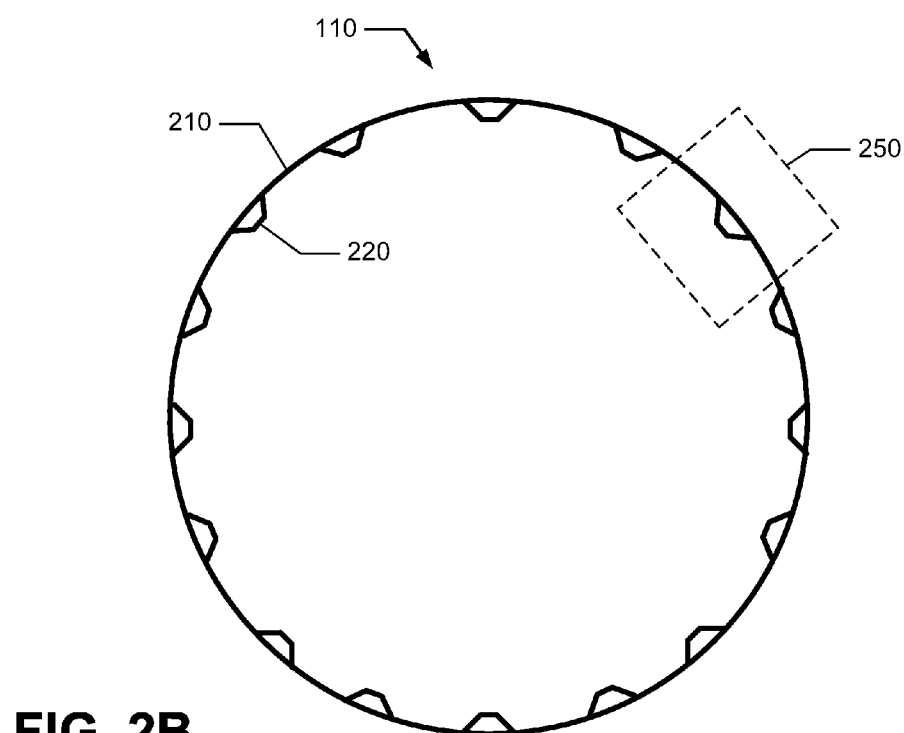
FIG. 2B

FIG. 4

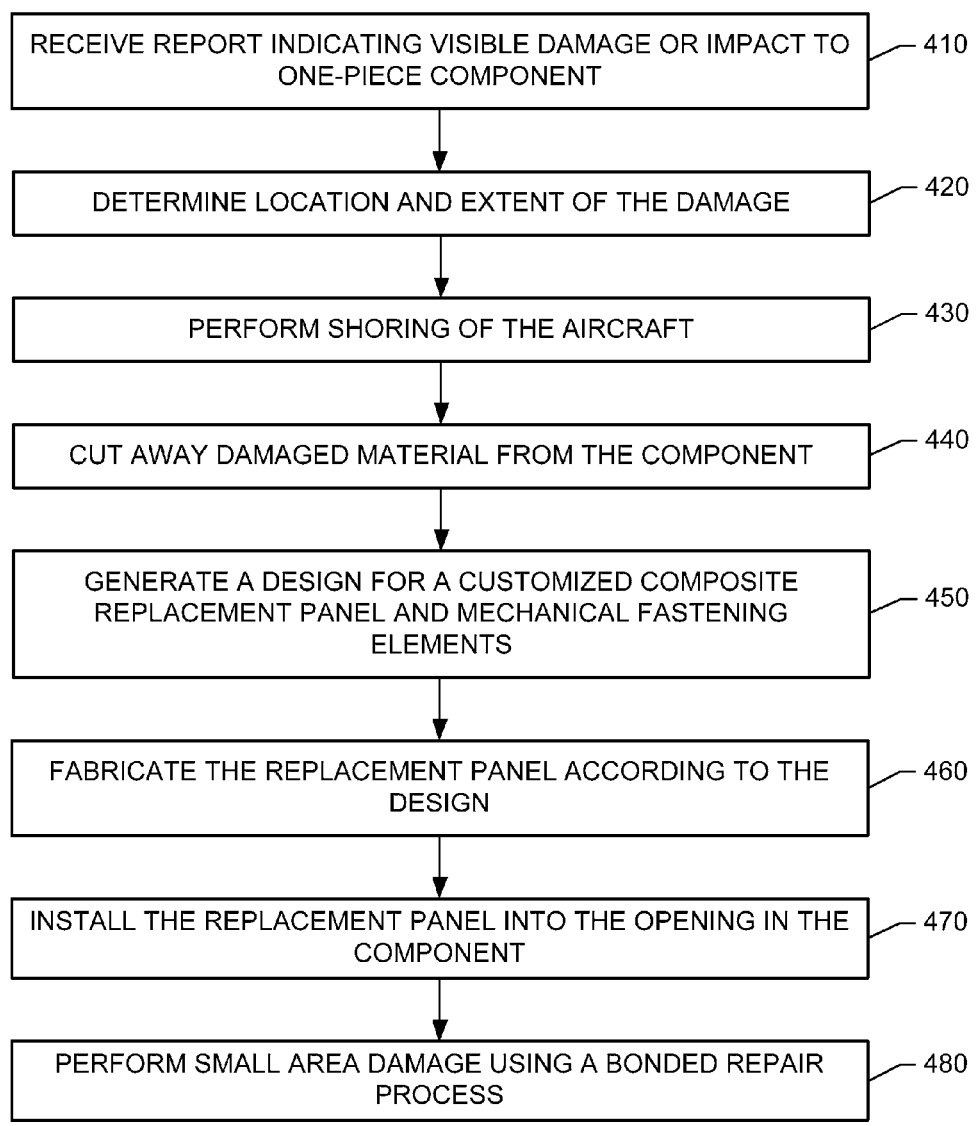

- 410 RECEIVE REPORT INDICATING VISIBLE DAMAGE OR IMPACT TO ONE-PIECE COMPONENT
- 420 DETERMINE LOCATION AND EXTENT OF THE DAMAGE
- 430 PERFORM SHORING OF THE AIRCRAFT
- 440 CUT AWAY DAMAGED MATERIAL FROM THE COMPONENT
- 450 GENERATE A DESIGN FOR A CUSTOMIZED COMPOSITE REPLACEMENT PANEL AND MECHANICAL FASTENING ELEMENTS
- 460 FABRICATE THE REPLACEMENT PANEL ACCORDING TO THE DESIGN
- 470 INSTALL THE REPLACEMENT PANEL INTO THE OPENING IN THE COMPONENT
- 480 PERFORM SMALL AREA DAMAGE USING A BONDED REPAIR PROCESS

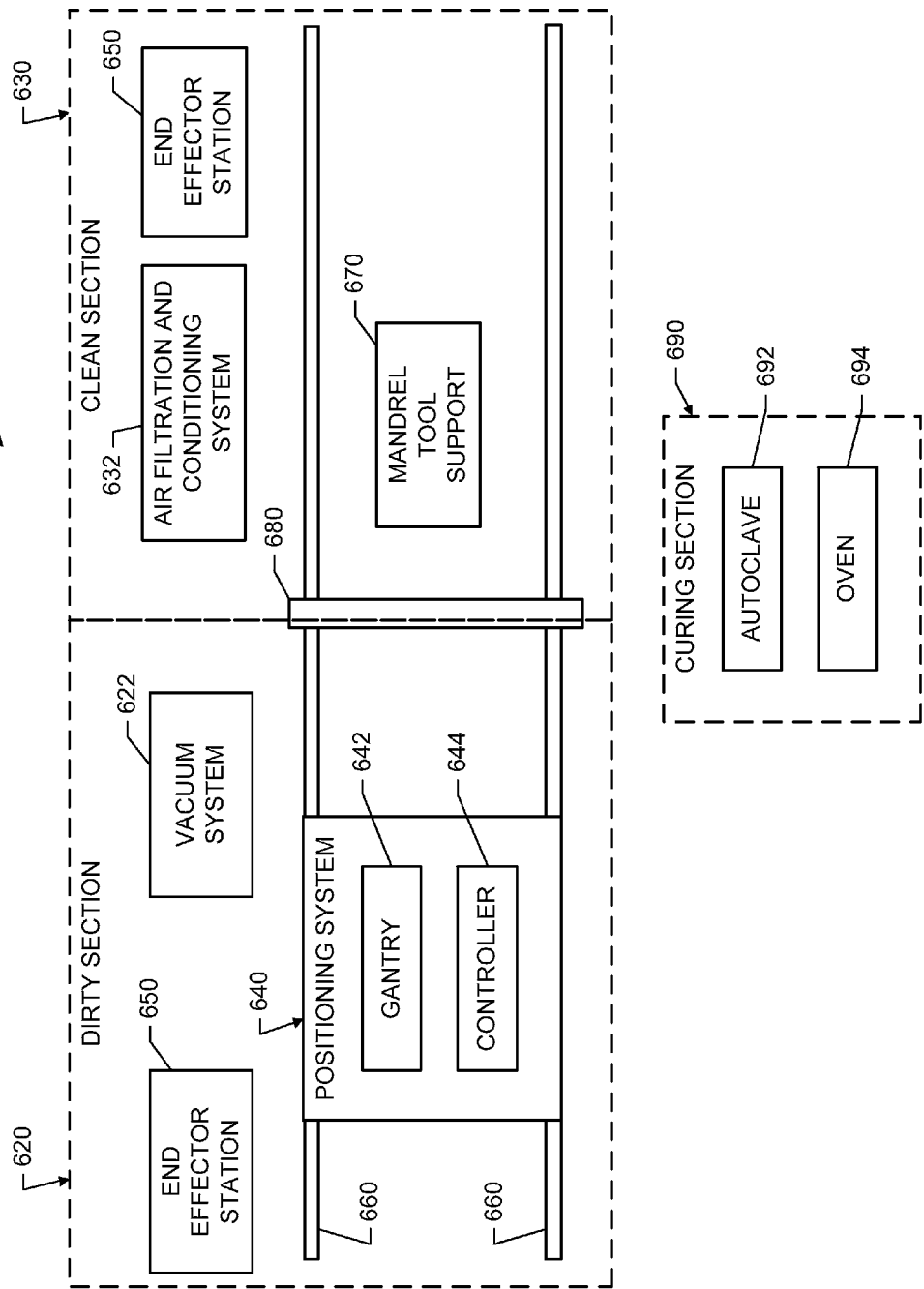

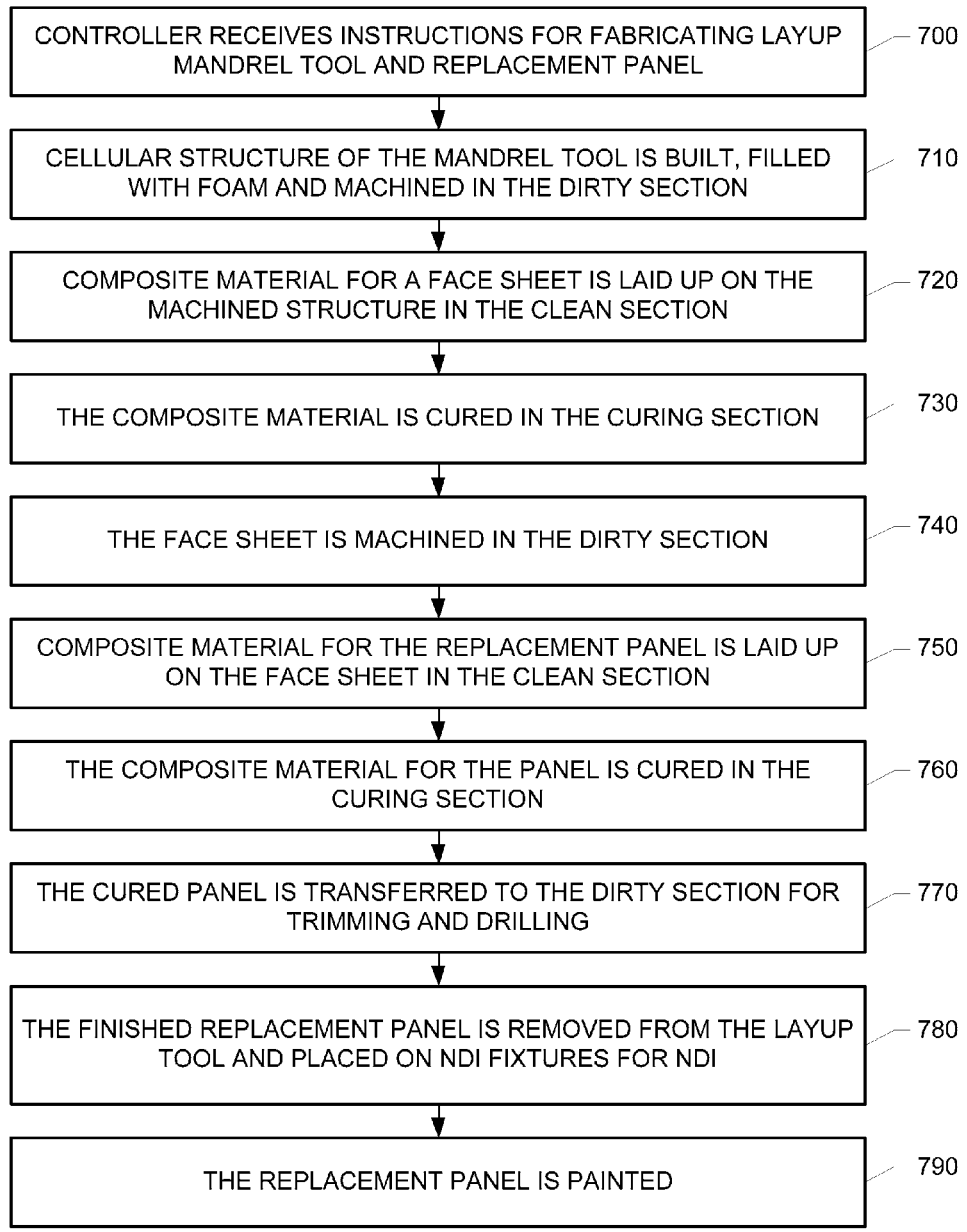

LARGE AREA REPAIR OF COMPOSITE AIRCRAFT

This application claims the benefit of provisional application 61/507,115 filed Jul. 12, 2011.

BACKGROUND

Commercial aircraft may be damaged by bird strikes, ground handling equipment, debris, hail and other unplanned events. These events can create holes and tears in aircraft skin, and damage to underlying stiffening substructure (e.g., frames, stiffeners and pad-ups). For instance, an aircraft's nose cab section may be damaged by a bird strike, a lower lobe may be damaged due to nose gear collapse, mid-section door surrounds may be damaged due to collisions with ground handling equipment, an end section lower lobe may be damaged by a tail strike, etc.

It is important to repair a damaged aircraft and return it to service as quickly as possible. Down time is very costly to an aircraft carrier, as an idle aircraft results in lost revenue.

Repair of a panelized aluminum aircraft is relatively straightforward. A damaged panel and underlying substructure are removed from the aircraft and replaced. If panels are available, the repair can be implemented relatively quickly.

Repair of a new class of composite commercial aircraft is not so straightforward, especially for large area repair of one-piece components. Consider a fuselage made up of several one-piece composite barrel sections. Each barrel section includes skin, hoop frames, and stiffeners (e.g., stringers). The stiffeners may be integrated with the skin (by co-curing during fabrication). The hoop frames may be mechanically fastened to the skin. If a large area of a fuselage section becomes damaged, removing and replacing the entire barrel section would be prohibitively expensive, disruptive to production, and time consuming.

A methodology for large area repair of one-piece composite aircraft components is needed.

SUMMARY

A randomly damaged area of a one-piece composite component of an aircraft is repaired according to a method herein. The damaged area covers skin and underlying stiffening substructure of the component. The method includes generating a design of a customized composite replacement panel for replacing the damaged area. The design includes replacement skin and underlying integrated replacement stiffening substructure. The method further includes fabricating the composite replacement panel according to the design.

According to another embodiment herein, a method of repairing a large area of one-piece composite aircraft component comprises generating a design of a customized one-piece composite replacement panel for replacing the damaged area. The design includes replacement skin, and underlying replacement stiffening substructure. The method further comprises fabricating a layup mandrel tool according to the design, and using the tool to fabricate the replacement panel. The tool and the replacement panel are fabricated at a single site.

According to another embodiment herein, a method of repairing a damaged one-piece composite barrel section of an aircraft fuselage includes generating a design of a customized composite replacement panel for replacing a large damaged area of the barrel section. The designed panel includes skin and integrated stiffening substructure. The method further includes fabricating fasteners for the replacement panel, fabricating the replacement panel according to the design, cutting damaged material from the damaged area, thereby leaving an opening in the barrel section, and installing the fabricated panel in the opening. The installation includes using the fasteners to mechanically fasten the fabricated panel to the barrel section.

BRIEF DESCRIPTION OF THE DRAWINGS

FIG. 1 is an illustration of an aircraft including a composite fuselage.

FIG. 2A is an illustration of skin and underlying stiffening substructure of a composite barrel section of the fuselage.

FIG. 2B is an illustration of a damaged area of a one-piece fuselage barrel.

FIG. 4 is an illustration of a method for repairing a damaged one-piece composite component of an aircraft, including design and fabrication of a composite replacement panel.

FIG. 6 is an illustration of a fabrication cell having adjacent clean and dirty sections.

FIG. 7 is an illustration of a method of using the fabrication cell to fabricate both the layup mandrel tool and the replacement panel.

DETAILED DESCRIPTION

Figure 3:
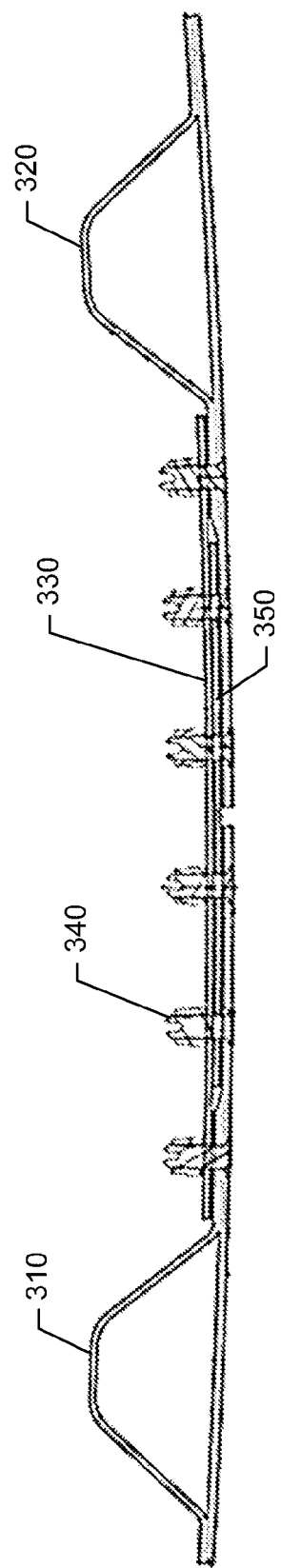
FIG. 3 is an illustration of a replacement panel that is attached to a skin panel via a bolted splice.

Reference is made to FIG. 1, which illustrates a composite aircraft 100. The aircraft 100 generally includes a fuselage 110, wing assemblies 120, and empennage 130. One or more propulsion units 140 are coupled to the fuselage 110, wing assemblies 120 or other portions of the aircraft 100. A landing gear assembly 150 is coupled to the fuselage 110.

In some embodiments, the entire fuselage 110 may be made of a single one-piece composite section. In other embodiments, the fuselage 110 may be formed by multiple one-piece composite sections. In the example illustrated in FIG. 1, the fuselage 110 is formed from the following one-piece composite barrel sections: a nose cab section (section 41), three mid sections (sections 43, 44 and 46), and end sections (section 47 and 48).

Passenger and cargo doors 160 are formed in all sections. Thus, all sections are susceptible to damage from ground handling equipment. All sections are also susceptible to damage from ground debris. The nose cab section is also susceptible to damage from bird strikes, which are high energy impacts. A lower lobe of the nose cab section is susceptible to damage due to nose gear collapse. A lower lobe of the end section is susceptible to damage by tail strikes.

Reference is now made to FIGS. 2A and 2B, which illustrate a randomly damaged area 250 of the fuselage 110. In addition to damage to the skin 210, the underlying integrated stiffening substructure 220 may also be damaged. The stiffening substructure may include longitudinally-extending stringers 220, which are co-cured with the skin 210.

The damage to the fuselage 110 may or may not be entirely visible. Examples of visible damage include holes and delaminations (e.g., separation of stringers 220 from skin 210). The location, exact size, and extent of the damage may not be known until non-destructive inspection is performed.

The damaged area 250 may be large. As used herein, a large area is at least 3 feet×3 feet or an approximately equivalent area thereof. Repairing the large area damage by replacing an entire barrel section or the entire fuselage is not desirable. Repairing the large area damage via a bonded repair process may not be practical, feasible or otherwise desirable (e.g., due to cost or logistics).

Reference is made to FIG. 4, which illustrates a method of repairing a damaged one-piece composite component of an aircraft. As used herein, the term component could refer to a major component such as a fuselage, or it could refer to a section of a major component, such as a barrel section of a fuselage.

The composite includes layers or plies of reinforcing fibers embedded in a matrix. One example of a composite is carbon fiber reinforced plastic (CFRP), where the constituents may include carbon fibers embedded in an epoxy matrix.

At block 410, the repair method is initiated upon receipt of a report. The report might indicate visible damage such as a hole in a section of the fuselage, or it might indicate damage caused by a triggering action such as caused by a thrown tire tread or damage caused by a ground handling vehicle bumping into a cargo door frame.

At block 420, the location and extent of the damage is determined. Non-destructive inspection such as ultrasonic inspection may be performed on an area having visible damage, or non-destructive inspection may be performed on an area after a triggering action, even if the damage at that area is not visible.

At block 430, prior to removing damaged material from the component, the aircraft may be provided with specific shoring for proper support. The shoring is used to maintain structural integrity. For example, if a large section of the nose lower lobe is removed, the landing gear is removed and external shoring is provided to support the aircraft from collapse.

At block 440, damaged composite material is cut away from the component, thereby forming an opening in the component. The damaged material may be removed by a cutting machine such as a router or rotary cutter (e.g., a diamond abrasive wheel) as appropriate for the thickness and type of cut. A straight cut may be made by the rotary abrasive cutter. A corner cut may be made by the router.

The opening may be trimmed. Router or trim templates may be used to support the trimming by guiding the cutting machine. The trimming is performed to satisfy engineering gap tolerances between the edges of the replacement panel and a boundary of the opening.

At block 450, a design is generated for a customized composite replacement panel for replacing the damaged area of the composite component. The design includes a detail panel definition for skin and integrated stiffening substructure. The detail panel definition may be created by starting with the original panel definition (based on skin and substructure that were originally used in the section), and modifying the original panel definition so the replacement panel can fit in the opening and match the contour of the component. The panel definition may include surface geometry including contour and features such as holes, trim locations. The panel definition may also specify ply boundaries, stacking sequence, fiber composition and orientations, and tape widths within each ply.

The panel definition may define material specifications for the panel. The material specifications may specify properties of the composite, including properties of the reinforcing fibers and the matrix.

In some embodiments, the detail panel definition specifies a one-piece replacement panel. That is, all underlying stiffening structure is co-cured with the skin.

In other embodiments, the detail panel definition does not specify a one-piece replacement panel, but rather a hybrid that includes custom-made integrated skin and stiffening substructure along with elements excised from existing components. For example, elements may be excised from a production fuselage section (barrel), or excised from a partially completed barrel, or excised from a decommissioned aircraft.

The design also includes a detail panel definition for mechanical fastening elements (e.g., splice doublers and fillers), which will be used to mechanically fasten the replacement panel to the component. Since the exact location of the damaged material and the exact extent of the damage is random and unpredictable, the splice joint configuration and details for the repair are likely not to exist and need to be created. The number of detail panels depends on size and complexity of the repair. In a complex repair, for instance, dozens of splice doublers and thousands of fasteners might be involved. This phase of design is unique to the damage.

The design may also include a panel assembly definition and an installation definition. These definitions describe how to attach the replacement panel to the component using the fastening elements (e.g., splice doublers, fillers, and fasteners).

At block 460, the replacement panel is fabricated according to the design. In some embodiments, the various elements (e.g., skin and stiffeners) are co-cured as is done in production. In other embodiments, some of the elements of the replacement panel may be mechanically fastened together (e.g., excised stringers bolted together and to the skin). However, co-curing is preferable, especially if the co-cured panel matches the existing configuration.

Additional cutting may be performed after the replacement panel has been fabricated. For instance, additional cutting may be performed if the replacement panel is larger than the opening. Additional trimming may be performed to ensure that engineering gap tolerances are met. This final fit up, which ensures that engineering gap tolerances are met, may be done at the repair site. The replacement panels may intentionally have usable excess which is trimmed at the repair site.

At block 470, the replacement panel is installed into the opening. The installation may include mechanically fastening the replacement panel to the component. For instance, numerous splice doublers (composite and/or titanium), fillers, and brackets may be used to fasten the replacement panel to the section.

Reference is made to FIG. 3, which illustrates a replacement panel 310 that is attached to a skin panel 320 via a bolted splice. The bolted splice includes a doubler 330 that is attached to both the replacement panel 310 and the skin panel 320 by bolts 340. Elements 350 such as fillers and shims may be used to fill gaps between the doubler 330 and the replacement panel 310 or skin panel 320. The splices generally have circumferential, longitudinal, and corner configurations.

Reference is once again made to FIG. 4. During the non-destructive inspection (performed at block 420), small area damage may also be revealed outside of the envelope designated for large area repair. At block 480, the small area damage may be repaired using a conventional bonded repair process. Bonded repairs or scarf repairs may be performed by sanding the damaged small area, filling with composite material and resin, and curing the resin.

The various functions of FIG. 4 may be performed by different qualified parties. For example, the design (block 450) may be performed by the airframe manufacturer. The replacement panel may be manufactured (block 460) by the airframe manufacturer or a third party at a qualified facility, using qualified tools, processes, and materials. The replacement panel may be installed (block 470) by Airplane on Ground (AOG) mechanics. Damaged material may be cut away (block 440) by the AOG mechanics. The shoring (block 430) may also be performed by AOG mechanics. The nondestructive inspection (block 420) may be performed by qualified personnel.

A method herein is not limited to the specific sequence of functions illustrated in FIG. 4. In some embodiments, the damaged material may be removed after the panel has been fabricated. It may take some time to fabricate the replacement panel. Therefore, the material removal may be delayed until shoring plans are complete and panels have been fabricated.

Thus disclosed is a methodology for repairing a new class of commercial aircraft having one or more one-piece composite components. A damaged one-piece section is repaired quickly, which allows the aircraft to be returned to service quickly. Consequently, aircraft down time is reduced.

Since it is important to repair a damaged aircraft and return the aircraft quickly to service, rapid fabrication of all parts necessary for the repair is highly desirable. The paragraphs that follow describe infrastructure for rapid fabrication of replacement panels. The infrastructure may include a fabrication cell for fabricating the mandrel tool and using it to fabricate a replacement panel. The infrastructure may also include a masterless mandrel tool for composite panel layup and curing.

Figure 5A:
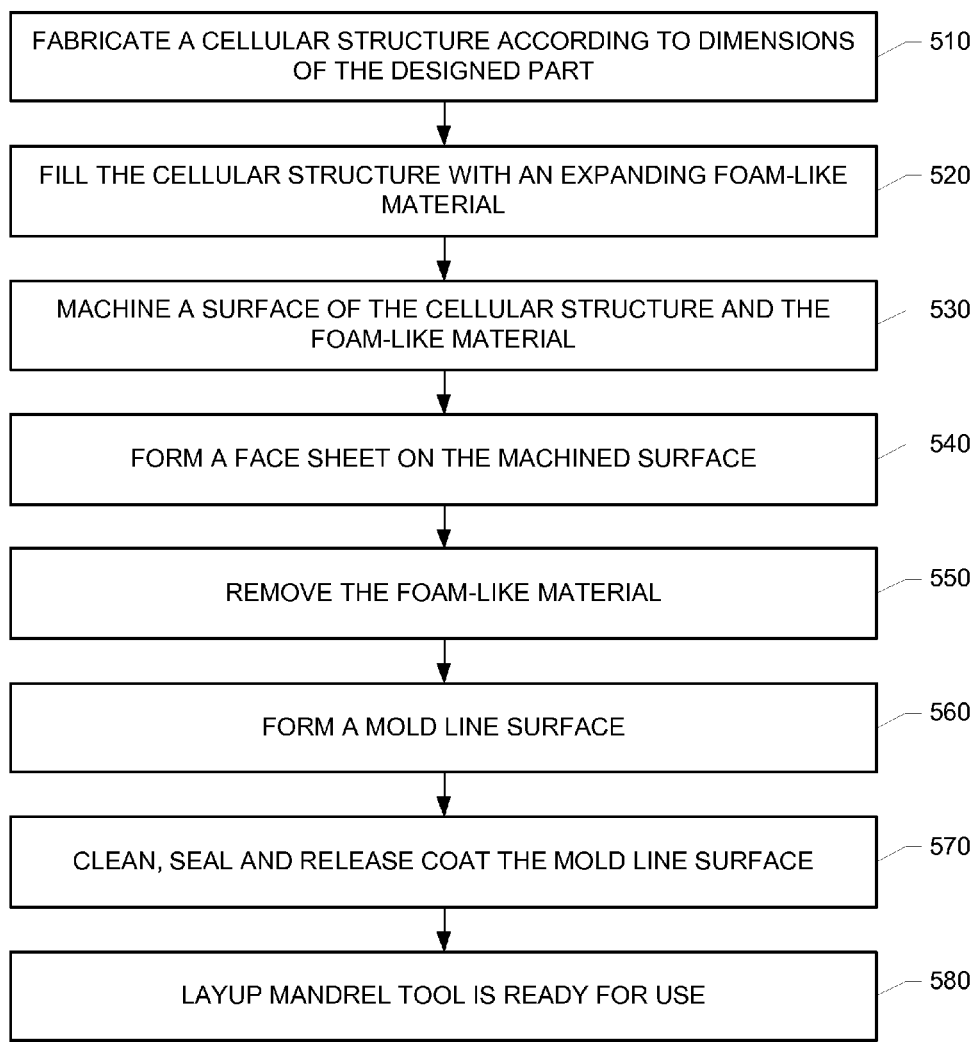
FIGS. 5A-5E are illustrations of the fabrication of a layup mandrel tool.

Reference is made to FIG. 5A, which illustrates a method of creating a masterless layup mandrel tool. A masterless tool refers to a tool having no permanent mold. In contrast, permanent molds are typically used for creating quantities of production composite tools.

At block 510, a cellular structure is fabricated according to dimensions of the designed replacement panel. The cellular structure provides a rough contour and profile for the replacement panel. For composite fuselage repairs, this may be constant curvature or compound contour. The cellular structure may be formed from header boards. Angles may be attached for additional reinforcement. The material system, and density and thickness of the header boards may be tailored to increase the stiffness and durability of the mandrel tool. Material systems may include epoxy or Bismaleimide (BMI), with BMI preferred for tools intended to be used for many runs. The header boards may be cut with a water jet, router, or other tool.

Figure 5B:
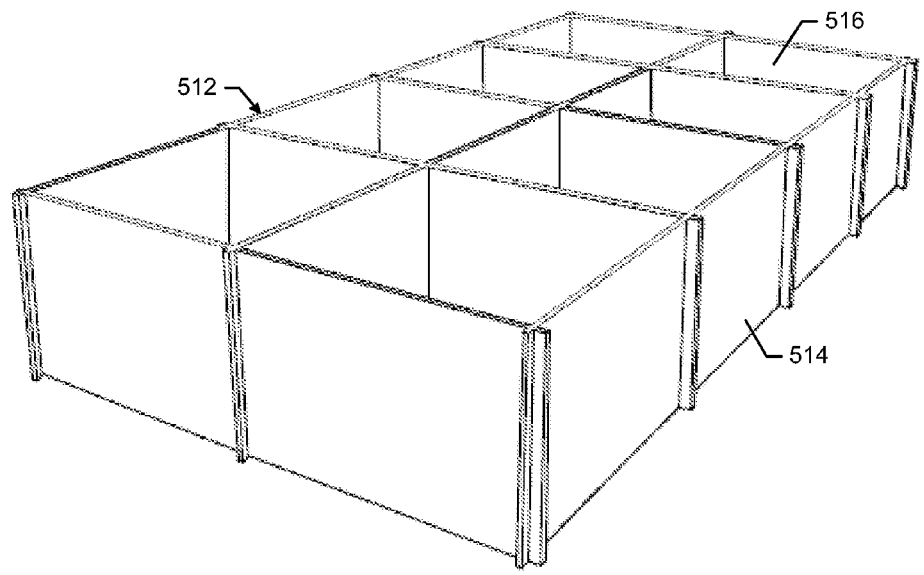

Additional reference is made to FIG. 5B, which illustrates an "egg crate" cellular structure 512. This cellular structure is formed from header boards 514, which define an array of open cells 516. The egg crate structure 512 is open at the top and bottom.

Figure 5C:
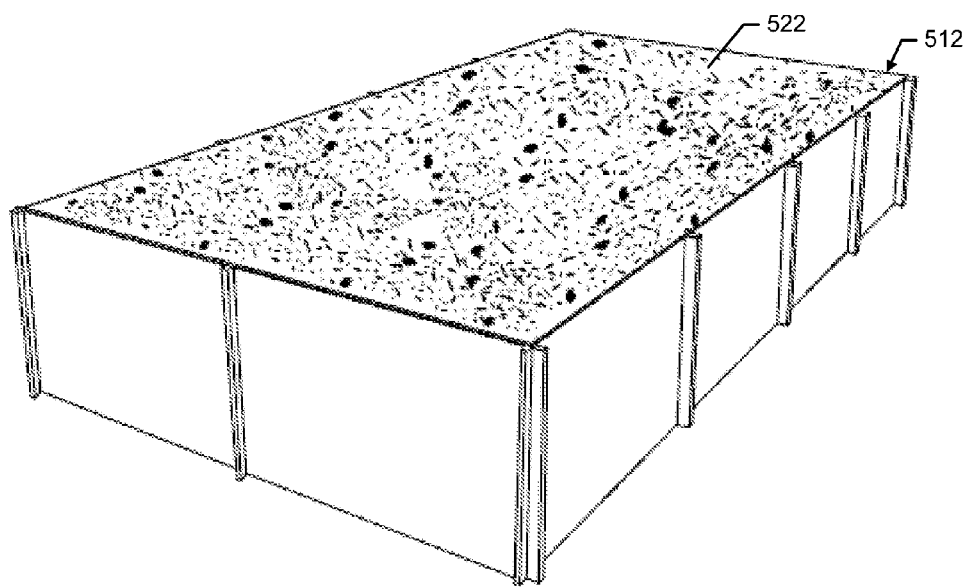

At block 520, the cellular structure 512 is filled with an expanding foam-like material 522 (see FIG. 5C). The foam-like material 522 maintains dimensional stability during processing conditions such as layup and curing. For instance, the foam-like material 522 does not degrade or shrink or expand at temperatures for resin infusion and curing, or curing of fibers that are pre-impregnated with resin ("prepregs"). Resin infusion is typically performed at about 200° F. and epoxy curing is typically performed at 350° F. The foam-like material 522 should not degrade or shrink or expand at these temperatures. Similarly, the foam-like material 522 should not distort under pressure during resin infusion (14.7 psi) or autoclave pressure of curing prepregs (about 85 psi). Dimensional stability and compressive strength requirements should be maintained so that a face sheet laminate, which is subsequently added to the tool surface, is cured in a predictable position. If dimensional stability of the foam-like material 522 is not achieved, additional material may need to be added to the face sheet. This is undesirable. For instance, if the face sheet is not in its desired location, some areas of the face sheet might be undercut (not cleaned up) and other areas might be overcut (too much material removed).

Examples of the foam-like material 522 include, but are not limited to, polyurethane, polyisocyanurate, carbon foam, ceramic, autoclave aerated concrete. The foam-like material 522 may be in the form of blocks, poured and cured, or some combination thereof, including mixed material systems. The foam-like material 522 may be sealed to prevent excess adhesive from enter the foam core.

Figure 5D:
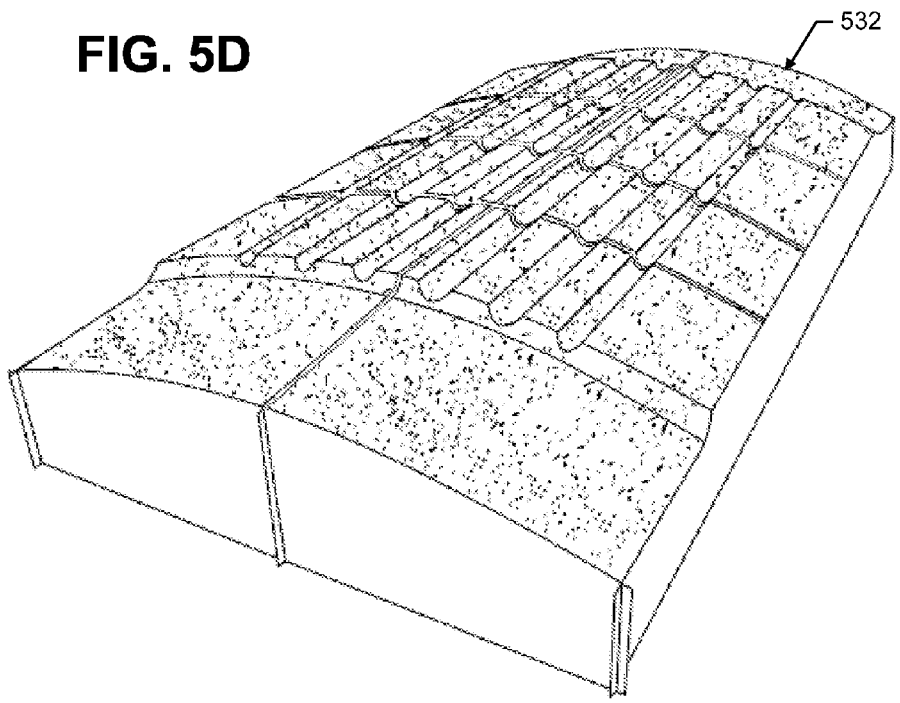

At block 530, the foam-like material 522 and the header boards 514 are machined to obtain a desired surface for layup of the tool face sheet. An example of the resulting machined surface 532 is illustrated in FIG. 5D.

At block 540, a face sheet is formed on the machined surface 532. Prior to forming the face sheet, however, an adhesive layer may be applied to the machined surface 532 to assist with bonding the face sheet to the header boards 514 and to keep resin from penetrating the foam-like material 522.

The face sheet may be formed by placing fabric including reinforcing fibers on the adhesive layer. The fibers may be dry or they may be prepregs. If the fibers are dry, the dry fibers are infused with resin. The resin-infused fibers or the prepregs are then bagged and then cured. In some embodiments, the face sheet may have a thickness between 0.25 inches and 1 inch.

At block 550, the foam-like material 522 may be removed from the cellular structure 512. For resin-infused fibers, the foam-like material 522 may be removed after resin infusion but prior to cure. For prepregs, the foam-like material 522 may be removed after cure. In some embodiments, the foam-like material 522 may be gouged and dug out from the back side of the cellular structure 512. In other embodiments, the foam-like material 522 may be removed in-tact as blocks.

In some embodiments, the foam-like material 522 may be removed completely from the cellular structure 512. In other embodiments, where the layup mandrel tool has a low profile, the foam-like material 522 may be left in the cellular structure 512, provided that it does not affect the quality of the replacement panel.

The foam-like material 522 may be removed to ensure that replacement panels meet thermal requirements during cure (e.g., transfers heat through the back side of the tool). The foam-like material 522 is an insulator that can insulate the backside of the tool from a heat source, thereby interfering with the necessary temperatures in the required times as determined by the cure profile requirements. For tools having short header boards, the foam-like material may have a lower thermal impact and, consequently, may be left in place.

If blocks of the foam-like material 522 are removed intact, the blocks can be re-used. Reusing the blocks can reduce future costs and increase speed of manufacture. To enable in-tact removal, steps are taken prior to casting the foam-like material 522 in the cellular structure 512. For instance, the walls of the header boards 514 may be lined with Teflon sheets, a release film, or other material that reduces the bond or coefficient of friction between the foam-like material 522 and the header boards 514. In addition, draft angles in the cellular structure 512 may facilitate removal as an angle may improve the ease by which the foam-like material 522 can be pulled out.

At block 560, the exposed surface of the face sheet is machined and sanded to form a mold line surface. The machining may be performed on a milling machine. The sanding is performed to impart a desired aero-quality surface finish to the mold line surface.

The face sheet surface could form an inner or outer mold line surface of the replacement panel, depending on the intended application of the replacement panel. Tool sides of the panel typically have a better surface finish than bag sides of the panel unless a caul sheet is used to create a better surface finish on the bag side of the panel.

At block 570, the mold line surface may then be cleaned, sealed and release-coated. The sealing fills any small voids, and the release coating provides a non-stick treatment so the cured replacement panel can be removed from the tool without binding.

Figure 5E:
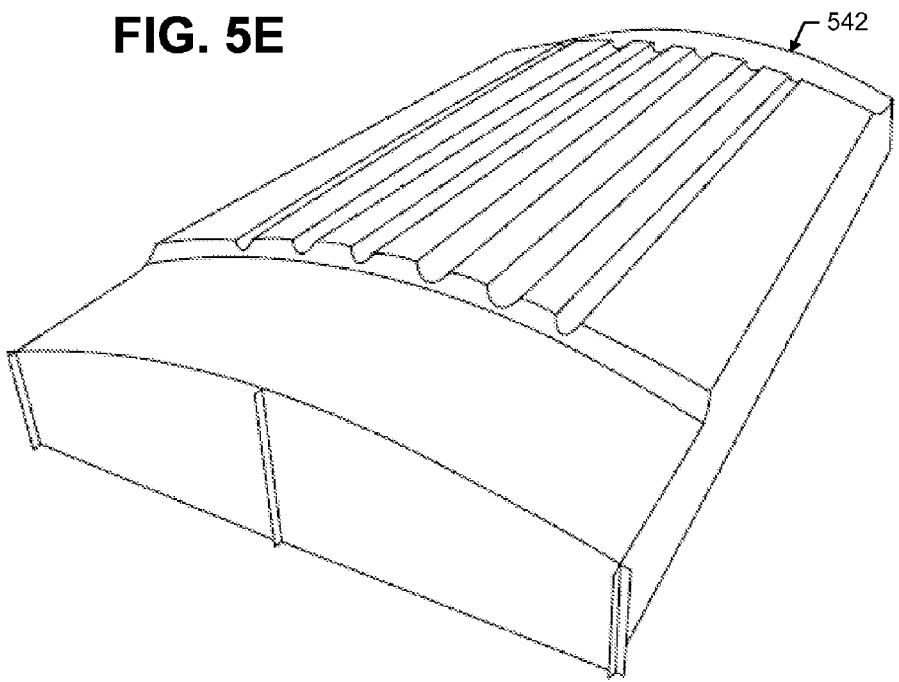

Additional reference is made to FIG. 5E, which illustrates an example of a layup mandrel tool including a machined face sheet 542. The face sheet 542 is co-bonded to the header boards 514. The header boards 514 provide integral stiffening to the face sheet 542, enable attachment to substructure for high profile tools, and provide a basic leveling system for low-profile tools (use as-is). The integral stiffening is valuable for larger face sheets 542, which become more "flimsy" as the face sheet area becomes larger. The integral stiffening also increases rigidity of the face sheet 542.

At block 580, the layup mandrel tool is ready for use. In some embodiments, the face sheet 542 may be separated from the header boards 514. In some embodiments, the tool may be used to fabricate replacement panels for large area repair of a composite aircraft component.

In other embodiments, the mandrel tool may be a section of a larger mandrel tool system. The mandrel tool system may be formed by assembling together a plurality of sections. A vacuum seal plane may be used between mandrel sections to ensure vacuum integrity across the entire mandrel system. If a tool section needs to be shipped from fabrication site to a layup site, it may be advantageous to assemble the sections at the layup site to avoid the cost and delays of oversize load shipping.

A high profile tool (generally greater than approximately 24 inches in height) may use a substructure to reduce the height of the header boards, and volume of foam-like material. The substructure may support the tool above a floor or a cart without sacrificing tool stiffness (the header boards provide stiffness to the face sheet surface). In contrast, a low profile tool may be used "as is" with relatively short header boards for panel production without the need for any additional substructure to support the tool from the floor or a cart.

Thus disclosed is a method of fabricating a layup mandrel tool rapidly. By simply changing a few parameters (header board density and thickness, face sheet thickness, and material system), the same architecture can be used to build layup mandrel tools for a wide range of replacement panels. The tools may be used for limited use prototype tool applications to durable tools capable of multiple production runs, and even master tools that can be used to produce other production tools.

Reference is made to FIG. 6, which illustrates a single fabrication cell 610 for manufacturing the mandrel tool and also using the mandrel tool to fabricate the replacement panel. By building the mandrel tool and using it at the same site, the cost, time, and logistics of shipping, (all of which are substantial for large commercial aircraft) are reduced. Only the fabricated replacement panel is shipped.

The fabrication cell 610 includes a dirty section 620 and a clean section 630. Operations in the dirty section 620 include, but are not limited to, assembly and machining (e.g., trimming, milling and drilling) of the mandrel tool and the cured replacement panel. Operations are considered dirty if they can produce dust that violates clean room requirements for the processing of uncured composite materials. For "dirty" operations such as machining, the dirty section 620 may include a vacuum system 622 for minimizing dust and debris to facilitate cleaning. The vacuum system 622 may have up to 98% or greater effectiveness from removing dust.

Operations in the clean section 630 include composite layup on a mandrel tool. In some embodiments, fibers may be deposited on a layup mandrel tool that is static. In other embodiments, fibers may be deposited on a layup mandrel tool while the tool is being rotated. The composite layup may include face sheet layup and panel layup.

Operations in the clean section 130 further include caul plate installation, bagging, and material cutting. For instance, fabric for resin infusion or pre-impregnation could be cut by an ultrasonic knife or other device, such as a ply cutter, or a hand tool. Resin infusion may also be performed in the clean section 630.

Operations are considered clean if they do not violate clean room requirements and require being performed in a clean room due to contamination concerns (e.g., processes that involve handling uncured composite materials). The clean section 630 may include an air filtration and conditioning system 632 for maintaining environmental conditions within specification. Generally, composite facilities require 400,000 class clean rooms with temperature, humidity, and particle count monitored. The equipment and tooling should satisfy these requirements when moved from the dirty section 620 to the clean section 630. Should the clean section 630 fall out specification, wait time may be required for air circulation filters of the system 632 to remove dust from the air.

The fabrication cell 610 includes a common end effector positioning system 640, movable between the dirty and clean sections 620 and 630, for performing all of these clean and dirty operations. The end effector positioning system 640 may use a plurality of interchangeable end effectors for performing the operations. The end effectors may be located at end effector stations 650 located in the dirty and clean sections 620 and 630. A manual, automatic, or semi automatic changer may be used to change end effectors in both dirty and clean sections 620 and 630.

The end effectors may include tools for machining (e.g., milling, drilling), a water jet cutter for tool header board, tools for trimming, a lamination head for tape or slit tape tow laydown of the panel or face sheet, a paint spray head for painting, an ultrasonic cutter for cutting prepreg or dry material, an NDI head (with necessary shoes) for ultrasonic inspection of the panel or tool face sheet, a stringer roll former for forming replacement panel elements, a material dispenser for tool or panel materials, a foam material dispenser for tooling foam application such as a 2-part polyisocyanurate system, a handling end effector for placing pre-cured foam tooling blocks in the tool header boards, and inspection probes for geometric and dimensional inspection of the tool face sheet or replacement panel.

In some embodiments, the end effector positioning system 640 may include a single positioning machine such as a gantry 642 having multiple axes of motion (e.g., up to seven axes). In other embodiments, the positioning system 640 may include a robot or multiple robots for performing the clean and dirty operations. A single robot may have interchangeable end effectors. Multiple robots may use combinations of dedicated end effectors.

Other types of end effector positioning systems may include combinations of linear Cartesian axis platforms, rotary axis platforms, and Stewart platforms using parallel kinematics. Specific examples include gantries, robots, robots-on-rail, post-mill type platforms, and Stewart platforms (e.g. hexapods). In each of these examples, the end effector positioning system 640 is configured to deliver a selected end effector to a position or along a path to perform its function, while satisfying performance requirements (e.g., angles, velocity, acceleration, stiffness, range of travel, utilities, quick-release coupling).

The end effector positioning system 640 is movable between the dirty and clean sections 620 and 630. In some embodiments, the end effector positioning system 640 may be moved by a machine rail system 660. In other embodiments, the end effector positioning system 640 may be moved via air bearings or wheels, and then locally positioned.

A mandrel tool support 670 is provided to support the mandrel tool during layup. In some embodiments, the mandrel tool support may include a table 670 that is moveable between dirty and clean sections 620 and 630. The table may be positionable between machine legs of a gantry 642.

The end effector positioning system 640 may be covered with sheet metal or other material that provides a smooth surface for cleaning. The end effector positioning system 640 may also utilize polyethylene type plastic as a protective covering. Such plastic may be easily removed for cleaning before transferring the end effector positioning system 640 from the dirty section 620 to the clean section 630. This all helps to maintain clean room requirements.

In some embodiments, a barrier 680 such as a fast door, strip door or freezer door separates the dirty and clean sections 620 and 630. These doors are designed to maintain environmental controls between areas with different conditions. The clean section 630 may be positive pressurized to keep out dust and other contaminants.

In some embodiments, the barrier 680 may include an airlock, which may be fixed or portable. The airlock may include of a chamber with two airtight doors in series which do not open simultaneously. In general, an airlock permits the passage of people and objects between a pressure vessel and its surroundings while minimizing the change of pressure in the vessel and loss of air from it. An airlock having an accordion design may include a portable sealed chamber that covers the end effector positioning system 640 as it when transitions between the sections 620 and 630 to keep any contaminants out of the clean section 630.

For movement from the clean section 630 to the dirty section 620, the clean section door is opened, the end-effector positioning system 640 (which is already clean) is moved into the airlock, the clean section door is shut, the dirty section door is opened, and the end effector positioning system 640 is moved into the dirty section 620. The dirty section door is then shut. For movement from the dirty section 620 to the clean section 630, the dirty section door is opened, the end-effector positioning system 640 (which is already dirty) is moved into the airlock, and the dirty section door is closed (the clean section door is already closed). The end effector positioning system 640 is cleaned (e.g., protective coverings are stripped off, and the system 640 is wiped down). After the environment inside the airlock is validated as clean, the clean section door is opened, and the end effector positioning system 640 is moved into the clean section 630.

The fabrication cell 610 may also include a nearby curing section 690 for curing of the face sheet and replacement panel. In some embodiments, the curing section 690 may include an autoclave 692 for curing prepregs under heat and pressure. In other embodiments, the curing section 690 may include an oven 694 for curing resin-infused fabric under heat or prepreg material designed for out-of-autoclave processing.

The curing section 690 is preferably adjacent to the clean section 630. Close proximity simplifies handling logistics. The tool and or panel may be shuttled to the autoclave on heat suitable castors or wheels on the underside of the mandrel tool or on a dolly designed to withstand autoclave cure.

Nondestructive inspection of the cured panel may be performed in the dirty section 620, provided that dust does not interfere with the non destructive inspection operation. Nondestructive inspection may be performed in the clean section 630.

The fabrication cell 610 may have a relatively small footprint. Consider an example of a fabrication cell for fabricating replacement panels as large as 45 feet long, 20 feet wide, and 12 feet tall. Such a cell may have a floor area of about 5,000 square feet and a ceiling height of about 25 feet. The floor of the fabrication cell 610 may be flat, with a foundation sufficient for the weight and loading of the end effector positioning system 640. The relatively small footprint enables multiple fabrication cells to be constructed at different locations instead of a single large cell being constructed at a large central facility.

An advantage of the fabrication cell 610 is that it may be located remotely from the aircraft manufacturer's main production facility. For instance, a fabrication cell may located closer to an airport or other location where aircraft will be repaired. The closer location saves significant logistics costs (e.g., packaging, transporting) and reduces flow time. This further reduces down time.

The fabrication cell 610 may also include a common controller 644 for moving the end effector positioning system 640 (e.g., gantry 642) along the rail system 660 and commanding the end effector positioning system 640 to perform the clean and dirty operations. The controller 644 may be fed programs from a programming and simulation tool. This programming and simulation tool may be designed to provide the necessary instructions for all end-effector types used within the fabrication cell 610.

Reference is now made to FIG. 7, which illustrates a method of using the fabrication cell 610 to fabricate both the layup mandrel tool and the replacement panel. At block 700, the controller 644 receives instructions for fabricating the tool and panel. The instructions provide the commands for the end effector positioning system 640 to select end effectors and use the selected end effectors to perform their desired functions. For a hole drilling end-effector, the instructions may include position and angle of the drill, feed rate, rotation speed, and drill cycle instructions. For milling of a tool or edge trimming of a part, the milling end-effector instructions may include the path for the cutter, angular position, rotation speed, and feed rate. For a fiber placement end effector, the instructions may include the path for the head, angular position, and cut and add commands for the different tows. The instructions may be produced by a programming and simulation module, which is designed for the fabrication cell 610. The programming and simulation module derives the instructions from engineering definitions associated with the composite part and tool. The engineering definitions may identify surface geometry and features such as holes, trim locations, and ply boundaries. The programming and simulation module takes these requirements from the engineering definition and converts them into instructions that can be processed by the fabrication cell 610. The controller 644 then executes the instructions to perform the following.

At block 710, a cellular structure of the layup mandrel tool is built, filled with foam and machined in the dirty section. The layup mandrel tool may be built with composite header boards, which may be cut with a water jet cutting tool or a router tool. In some embodiments, the header boards may be assembled on and secured to a moveable table, whereby the moveable table "becomes" part of the mandrel tool.

The resulting cellular structure is assembled and filled with foam, using dispensed and mixed liquid, blocks of pre-cast material, or a combination thereof. Following build up, the end effector positioning system 640 selects a milling end effector from the end effector station 650, loads the milling end effector, and machines the foam and header board. The end effector positioning system 640 then selects and loads a probe head, and uses the probe head for location verification or inspection to validate geometry.

At block 720, reinforcing fibers for a face sheet is laid up on the machined cellular structure in the clean section. In some embodiments, fabric may be dispensed by a fabric dispensing end effector, and the dispensed fabric may be cut by an ultrasonic cutting knife end effector. The fabric may be deposited by an end effector that performs automated fiber placement (AFP) or automated tape layer (ATL). In other embodiments, the layup may be performed manually.

At block 730, the composite material is cured in the curing section 690. A resin-infused layup is cured in the oven, or a prepreg layup is cured in the autoclave, or an out-of-autoclave system is cured in an oven. Resin infusion may include a post-cure at approximately 350° F. for epoxy materials, and higher for BMI materials. Prior to post-curing, the foam-like material may be removed from the mandrel tool, especially for tools having taller header boards.

At block 740, the face sheet is machined in the dirty section. Any necessary hand finish is also performed in the dirty section. Appropriate vacuum is utilized for dust collection. Sealing of the tool may also be performed using an automated end effector (spray of roller) or manual process. A finished layup mandrel tool is then cleaned and transferred to the clean section for panel layup.

At block 750, composite material for the replacement panel is laid up on the mandrel tool in the clean section. The panel layup may be performed automatically by the end effector positioning system 640 (for example, with an end effector that performs AFP or ATL) or the panel layup may be performed manually.

Caul plates may then placed on the panel layup depending on finish requirements). The panel layup is then bagged, and moved to the curing section.

At block 760, the composite material for the panel is cured in the curing section 690. At block 770, the cured panel is transferred to the dirty section 620, where trimming and drilling are performed.

At block 780, following trimming and drilling, the finished replacement panel is removed from the layup tool. A relatively large panel may be removed with a lifting fixture. The finished part is placed on an NDI fixture to enable ultrasonic inspection. The end effector positioning system 640 may perform NDI by selecting NDI end effectors (shoes) that are applicable for the panel geometry.

At block 790, following NDI, the replacement panel is moved to the dirty section, where it is painted (in other embodiments, the painting may be performed in a separate facility). The gantry may use a painting end effector. Some additional ventilation (portable ducts, etc.) may be provided to facilitate painting in the dirty section.

The layup mandrel tool and the end effector positioning system 640 are cleaned prior to moving from the dirty section 620 to the clean section 630. If a foam or carbon fiber is cut, a high performance vacuum collection system 622 may be deployed to minimize dust, possibly with some coolant to keep airborne particles to a minimum.

Conventional composite and metallic (e.g., titanium) fabrication techniques may be used to fabricate splice doublers and other elements for fastening the replacement panel. In some embodiments, titanium fastening alone, or composite elements alone, or a combination of titanium and composite fastening elements may be used. The elements made of titanium may be fabricating by conventional titanium fabrication processes such as hot forming and machining. The composite fastening elements may be fabricated by conventional composite prepreg fabrication techniques such as hand layup, bag, cure, trim and non-destructive ultrasonic inspection. Automated Fiber Placement (AFP) may be used instead of hand layup for unidirectional material. In some embodiments, composite doublers, fillers, and splices could be built using the same production site following the same or similar processes as the replacement panel.

In some embodiments, a separate clean section is not used. Instead, all operations are performed in a single room. For instance, the single room may include a dust collection system that is satisfactory to maintain clean room specifications. Other embodiments may use temporary/disposable coverings that are placed on machines and tool areas to keep them clean. For example, the covers may include polyethylene film. Some wiping down of the machines and tools may be performed between operations. The same machine could perform layups in the clean room and use an ultrasonic cutting head for cutting materials.

In some embodiments, the layup mandrel tool may be built at one site and used at another site. However, extra steps may include shipping the mandrel tool to the build site, and unpackaging the tool and setting up the tool at the build site. Fabricating the mandrel tool and using it at the same site saves significant logistics costs and reduces flow time.

During layup of the panel and the face sheet, fabric is deposited on a surface of the mandrel tool (either the machined surface of the header boards/foam or the mold line surface of the face sheet). The mandrel tool support 670 of FIG. 6 supports the mandrel tool during layup. In some embodiments, the mandrel tool support may be static during layup.

In other embodiments, the mandrel tool may be rotated during layup. In these other embodiments, the mandrel tool support may include a rotary mandrel tool support. The support is used to rotate a mandrel tool while reinforcing fibers are deposited on a layup surface of the mandrel tool.

Figure 8A:
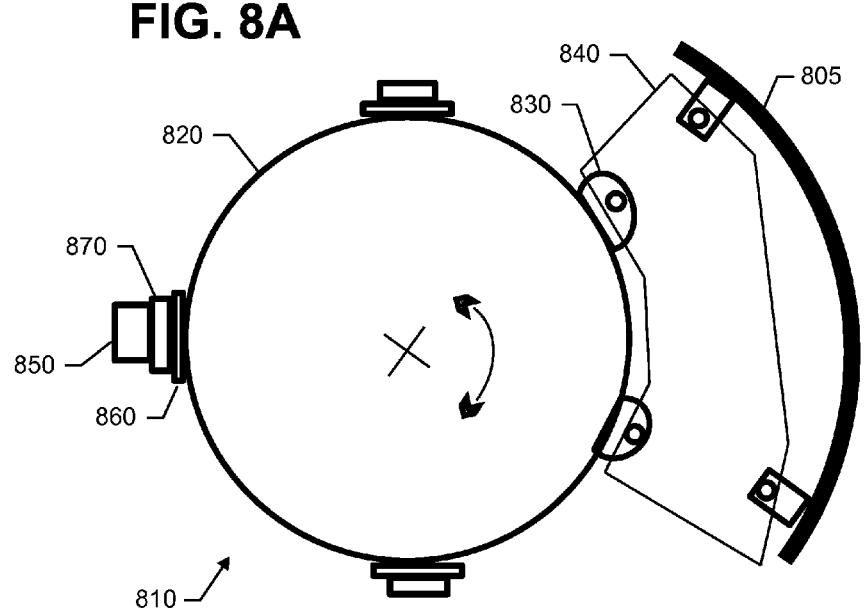
FIGS. 8A and 8B are illustrations of a rotary mandrel tool support including a spindle with counterbalancing.
Figure 8B:
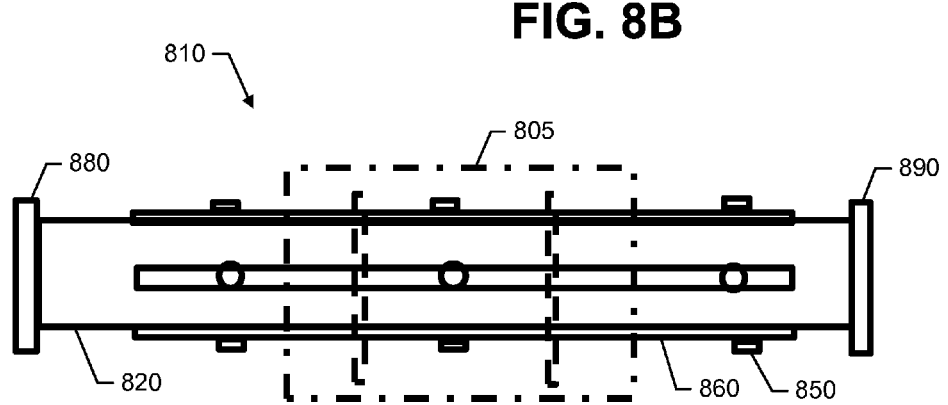

Reference is now made to FIGS. 8A and 8B, which illustrate an embodiment of a rotary support 810 for a mandrel tool 800. The mandrel tool 800 includes a face sheet 805, which provides the layup surface. The face sheet 805 may have integral stiffening through its thickness, or it may have a backing support for stiffening (e.g., the header boards). The mandrel tool 800 in FIGS. 8A and 8B does not include header boards.

The rotary support 810 including a spindle 820. The spindle 820 is rotatable about its longitudinal axis. The spindle 820 is not limited to any particular geometry. Examples of spindle geometries include but are not limited to cylinders, rectangular prisms, and prisms having non-rectangular cross-sections.

The spindle 820 has attach points 830 for mounting a range of face sheets 805. Two attachment points 830 are illustrated in FIG. 1. Additional pairs of attachment points 830 may be provided along the length of the spindle 820.

Different face sheets 805 may have different diameters, lengths, layup surface contours, arc lengths, radii, weight, etc. A face sheet 805 having roughly the same diameter as the spindle 820 may be mounted directly to the attach points 830 of the spindle 820. A face sheet 805 having a larger diameter than the spindle 805 may be mounted to the spindle 810 with an adapter 840 (which is shown in FIG. 8A).

In some embodiments, the attach points 830 may include tabs with through holes, or tabs with tapped holes on the spindle 820. The face sheet 805 may utilize a similar set of attach points or tabs can be directly fastened (mechanically, for example, by bolts or pins) to the spindle 820. The mechanical fastening allows the face sheet 805 to be easily attached to and removed from the spindle 805.

The rotary support 810 further includes an adjustable counterbalance system for adjusting stiffness and support balance requirements (e.g., center of mass) to accommodate the mounted face sheet 805. Counterbalance weights 850 may be added to and removed from the spindle 820 via attach plates 860. Spacers 870 may be located between the weights 850 and attach plates 860. The spacers 870 may be used to increase the distance of the weights 850 from the center of the spindle 820 for additional moment. Considerations for counterbalancing include tool/layup weight, spindle length, location of the face sheet 805 on the spindle 820, and spindle deflection.

Prior to performing the counterbalancing, the center of mass of the face sheet 805 and the adapter substructure 840 (shown in phantom in FIG. 8B) may be determined. The center of mass may be determined with computer aided design (CAD) software. A center of mass may then be calculated for the weights 850, plates 860, and spacers 870. From these calculations, the amounts and locations of the weights 850, plates 860 and spacers 870 may be estimated.

There are several ways of supporting the spindle 820 while the counterbalancing is being performed. As one example, the spindle 820 is rotated between a headstock 880 and tailstock 890. The positions of the weights 850 are adjusted so rotation of the spindle 820 can be initiated with minimal force and the spindle 820 can thereafter spin freely without imbalance.

Figure 9:
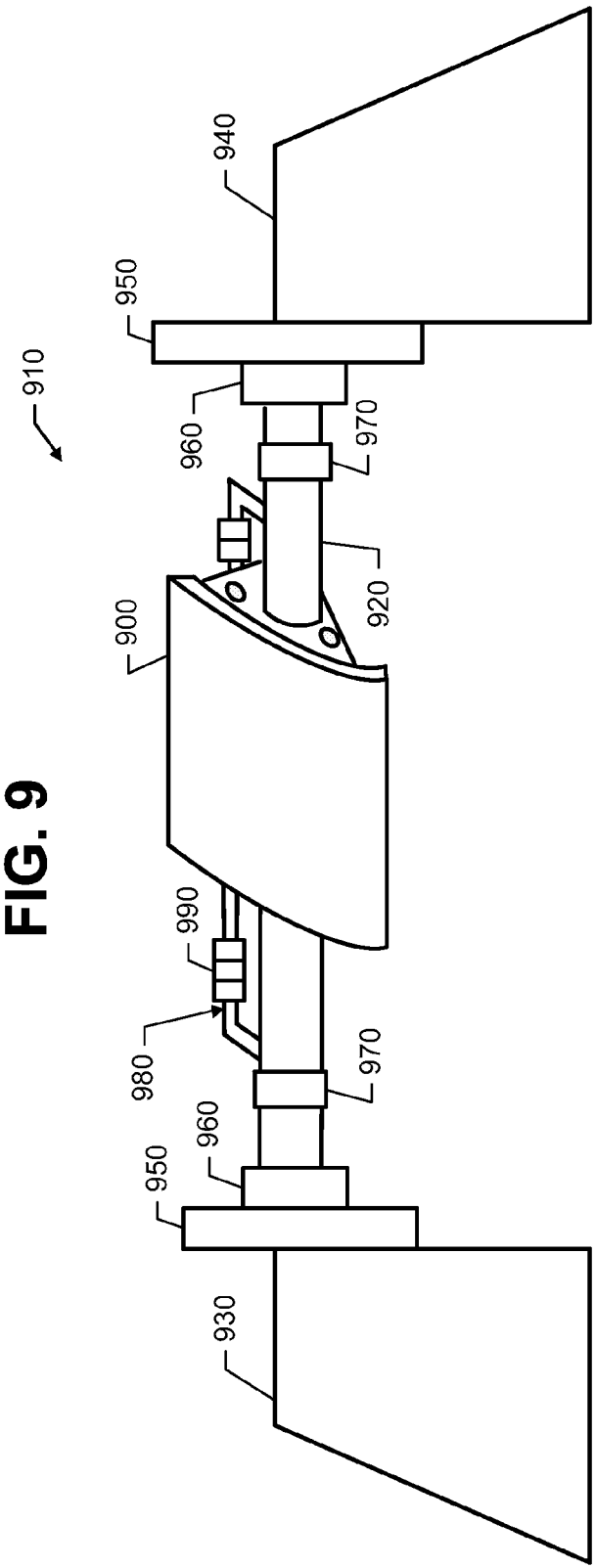
FIG. 9 is an illustration of a rotary mandrel tool support including a spindle with counterbalancing and length adjustment.

Reference is now made to FIG. 9, which illustrates a rotary mandrel tool support 910 including a spindle 920 with counterbalancing and length adjustment. The rotary support 910 includes headstock 930, tailstock 940 and rotating face plates 950 for rotating the spindle 920. The spindle 920 may be removably mounted to the face plates 950 by bolted attachment plates 960.

The rotary support 910 includes a length adjustment mechanism 970 for varying spindle length. For example, the length adjustment mechanism 970 may include a telescoping mechanism, or it may include spacers or segments that are added or removed to achieve a desired length. The spindle length may be adjusted to accommodate face sheets 900 of different lengths, depending on the size of the work envelope (i.e., distance between the headstock 930 and the tailstock 940). In some embodiments, the work envelope may range from approximately 10 ft to 50 feet.

Some embodiments of a rotary support herein do not include a length adjustment mechanism. Instead, the spindle may be fixed at a maximum length that depends upon the work envelope.

An adjustable counterbalance system 980 may be used to make balance and center of mass adjustment. Weights 890 may be added to and removed from the counterbalance system 980 as needed.

A rotary support herein allows a single spindle to be used for a range of different face sheets. The different face sheets, in turn, allow for a range of layup sizes. For instance, the layups may range from 3 ft×3 ft to upwards of 42 feet×20 feet.

Given the random nature of damage to an aircraft, replacement panels for large area repair will take on different shapes and sizes. Advantageously, layups of different sizes and contours may be created by simply replacing a face sheet and performing counterbalancing for stiffness and center of mass to satisfy machine balance requirements.

During design of the replacement panel, the panel definition specifies the width of the tape that will be used during composite layup. That panel definition may specify the width of the tape used during layup of the original panel. However, fabrication speed may be increased during layup by using a wider tape. By using wider tape, layup flow times may be reduced, since laydown is faster for the same number of tows in a course. The wider tape may also enable manual layup as a fabrication option. The wider tape may provide a faster manufacturing solution for constant contour smaller or flat panels, or far larger panels if, for instance, an AFP machine is down for repairs.

Figure 10:
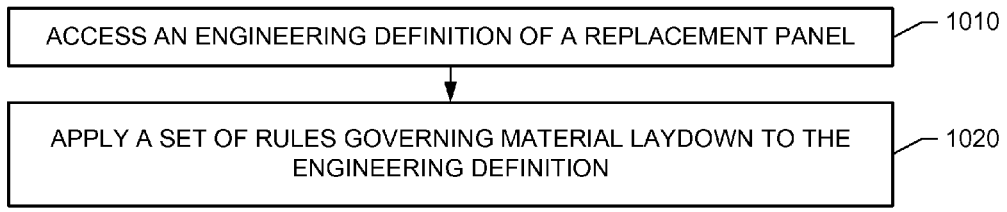
FIG. 10 is an illustration a method of determining whether tape width may be increased for a replacement panel.

Reference is now made to FIG. 10, which illustrates a method of determining whether wider tape may be used. At block 1010, an engineering definition of a replacement panel is accessed. In addition to specifying material and surface geometry, the engineering definition may also define process specifications for the replacement panel. These process specifications may include layup instructions, processing instructions, cure instructions, processor qualifications, and inspection instructions. Process specifications may also describe allowable deviations during laydown (e.g., laps, gaps, and angular deviation from the rosette) and allowable defects in the layup (e.g., wrinkles and puckers).

At block 1020, a set of rules governing material laydown is applied to the engineering definition prior to performing the laydown. The rules identify deviations and defects that will result if material of a given width is laid down in a specified direction and position. Laminates from different width materials have different mechanical performance. Different types of laminates may also have different mechanical performance.

These rules include algorithms that determine tape path for each layer of tape (a tape path includes a series of coordinate positions that determine the movement of a tool (e.g., a fiber placement head) during a machining operation). The algorithms include path generation algorithms that determine minimum steering radius for each different tape width. The algorithms further include, but are not limited to rosette algorithms that specify a rosette (direction); and natural path (which may be characterized as the path that produces a state of neutral fiber tension, where the same distance is continuously maintained between both sides of the tape).

The rules indicate whether, based on the rosette and contour of the part, material of a given width may be laid down in the desired direction and position without defects such as wrinkles or puckers. Consider the following example. Wider tape or slit tape will generally have a smaller minimum steering radius than narrower tape (where minimum steering radius is the smallest radius by which material can be steered material with an acceptable level of wrinkles or puckers. A rule may determine whether a wider tape violates the minimum steering radius.

The rules are derived from process specifications and empirical material performance. For example, minimum steering radius may be obtained for different types (material system, weave, resin content, etc.) and width of composite material by testing on a flat plate and looking for wrinkles or puckers that are within allowable limits. The type of machine used and process parameters (e.g. tension, compaction force) for the machine may also influence the results. Laminate mechanical property performance is another example of data that can be provided from testing, such as tension and compression testing. Initially, the empirical data may be obtained from testing material coupons. Over time, additional data may be obtained from testing subcomponents, or complete assemblies.

The result of applying the rules is a list of tapes (by type and width) that may be used to fabricate the composite part. In some instances, the list may indicate allowable tapes per ply or part portion. As a first example, consider a contoured or compound contoured fuselage section. For this part, the list allows up to a 6" wide tape for a 90 degree fiber orientation, but no more than a one-half inch tape for other fiber orientations (e.g., 0 and 45 degrees).

As a second example, the list allows a ½" wide material for all areas and all fiber orientations of a part, except for one small zone. The list allows narrower width material (¼") for that small zone.

The method of FIG. 10 enables the producibility (or manufacturability) of the replacement panel to be tested before the part is actually fabricated. By considering an increase in tape width during the design of the replacement panel, empirical testing is minimized, thereby speeding up part production. Trial and error are avoided. Multiple iterations of redesigning, refabricating and revalidating the panel are avoided. Considerable time and cost is saved from the need to physically build validation coupons and follow an iterative process of testing. This reduction in time is especially valuable for designing and fabricating replacement panels that are customized.

In some instances, a plurality of fabrication cells will be available to fabricate a replacement panel. These facilities have different capabilities including, but not limited to, the types of layup (hand versus automated) that may be performed, the type of machines that are available, the type of end effectors that are available, and the widest available tapes that can be deposited.

Figure 11:
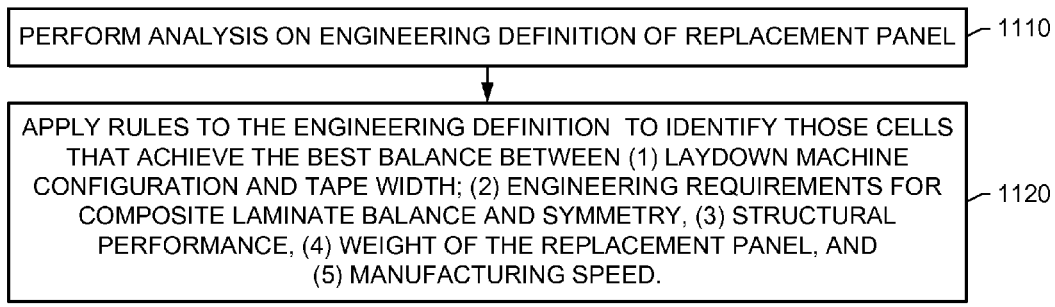
FIG. 11 is an illustration of a method for selecting a cell to fabricate a composite replacement panel.

Reference is now made to FIG. 11, which illustrates a method of performing a rule-based producibility analysis, not only to increase tape width, but also to find a fabrication cell for fabricating a replacement panel. At block 1110, analysis is performed on the engineering definition of a replacement panel to understand the magnitude of the contour of the panel. By understanding the magnitude and contour, choices for tape width can be narrowed. For typical automated fiber placement material, typical material widths of ⅛", ¼", and ½" may be used. For hand layup and automated tape layup, wider tapes of 3", 6", and 12" may be used. For hand layup, broad materials in typical widths of 36", 48", and up to 60" may be used.

Some of these candidate tape widths can be eliminated at this step. For example, compound contour panels are highly unlikely candidates for hand layup (likelihoods would be based on prior producibility knowledge). Automated layup with narrower tapes (⅛", ¼", ½") would only be considered. On the other hand, panels having relatively uniform surfaces might be candidates for hand layup with 6" tape. The initial analysis reduces the overall analysis time by narrowing the type of layup (e.g., hand layup versus automated layup), candidate tape widths (e.g., ½" tape versus ¼" tape), candidate automated machines (e.g., machines not having capability to lay down ¼" tape would be eliminated from further consideration), and candidate cells (e.g., cells not having capability to lay down ¼" tape would be eliminated from further consideration).

At block 1120, a set of rules is applied to the engineering definition to identify the widest tape and best cell for fabricating the replacement panel. The rules identify those cells that achieve the best balance between (1) laydown machine configuration and tape width; (2) engineering requirements for composite laminate balance and symmetry, (3) structural performance, (4) weight of the replacement panel, and (5) speed of manufacturing the replacement panel (e.g. within material out time limits, machine capability, machine availability window, labor time/cost, customer need date, etc.). Other factors to be balanced may include, but are not limited to manual laydown instead of automated laydown, and engineering change effort. Engineering change effort refers to modifications from existing production configuration to incorporate different tape widths. This balance involves a trade in design change time for production time.

For instance, the rules may determine whether a laydown machine configuration can perform a layup at a specified tape width, as there are limits to course sizes due to compliance of the panel surface. Consider the example of machines that have thirty two ½" wide tows or slit tape of material and others that have sixteen ½" tows. The compaction roller for a ½" thirty two-tow machine is 16 inches, whereas it is 8 inches for a ½" sixteen tow machine. For the same width tow, the greater the quantity of tows that can be simultaneously employed, the faster the laydown time, assuming constant speed. In some cases, depending on panel contour the number of tows out of the total available may be limited. For example, a machine with thirty two tows over a panel with a complex contour, may have a limit of eighteen or nineteen tows that can be effectively used because of roller compliance, and in some cases potentially less, so a ½" (32) tow machine may provide unneeded capacity for a given panel configuration. Wider tapes will likely have more challenges in compliance, especially over complex contours. Assuming a common laydown speed, the more tows, the faster material can be laid down and the faster the panel can be fabricated.

Figure 12:
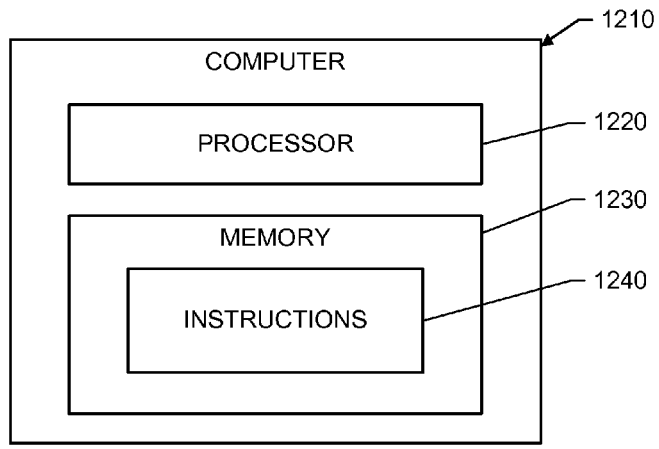
FIG. 12 is an illustration of a computing machine for performing the method of FIG. 11.

Reference is now made to FIG. 12, which illustrates a computer 1210 including a processor 1220, and memory 1230. The memory 1230 contains instructions 1240 for causing the computer 1210 to perform the method of FIG. 11.

The invention claimed is:

1. A method of repairing a randomly damaged area of a one-piece composite component of an aircraft, the damaged area covering skin and underlying stiffening substructure of the component, the method comprising:
   generating a design of a customized composite replacement panel for replacing the damaged area, the design including replacement skin and underlying integrated replacement stiffening substructure; and
   fabricating the composite replacement panel according to the design.

2. The method of claim 1, wherein the component is a one-piece composite barrel section of a fuselage.

3. The method of claim 1, wherein the replacement panel is designed to match contour of the damaged area.

4. The method of claim 1, wherein the damaged area is at least 3 feet×3 feet.

5. The method of claim 1, wherein generating the design includes generating a panel detail definition for the replacement panel and also a detail definition for elements for fastening the replacement panel to the component.

6. The method of claim 5, wherein the fastening element detail definition defines splice doublers for attaching the replacement panel to the component.

7. The method of claim 5, wherein the design specifies a one-piece replacement panel.

8. The method of claim 5, wherein the design specifies skin and integrated stiffeners, and also at least one excised element.

9. The method of claim 1, further comprising cutting damaged material from the damaged area, thereby leaving an opening in the component; and installing the fabricated replacement panel in the opening, including mechanically fastening the replacement panel to the component.

10. The method of claim 1, further comprising repairing small damaged areas via a bonded repair process.

11. The method of claim 1, wherein fabricating the replacement panel includes fabricating a custom layup mandrel tool and using the fabricated tool for layup and curing of the replacement panel.

12. The method of claim 11, wherein the mandrel tool is fabricated in a fabrication cell and used in the same fabrication cell to fabricate the replacement panel.

13. The method of claim 12, wherein the fabrication cell includes a dirty section for performing dirty operations on the mandrel tool during fabrication and on the panel after the panel has been cured; and a clean section for composite layup of the replacement panel on the mandrel tool.

14. The method of claim 13, further comprising using an end effector positioning system for performing the clean and dirty operations; and moving the end effector positioning system and the mandrel tool between the clean and dirty sections.

15. The method of claim 14, wherein the end effector positioning system uses a plurality of interchangeable end effectors to perform the clean and dirty operations.

16. The method of claim 13, wherein the dirty operations in the dirty section include trimming and machining of the mandrel tool and the cured panel; and wherein clean operations in the clean section include panel layup and material cutting.

17. The method of claim 13, further comprising performing nondestructive inspection of the replacement panel after curing.

18. The method of claim 13, further comprising a curing section, adjacent the clean section, for curing.

19. The method of claim 18, wherein:
the mandrel tool is built and machined in the dirty section;
composite material for the replacement panel is laid up on the mandrel tool in the clean section;
the composite material for the panel is cured in the curing section; and
the cured panel is machined in the dirty section.

20. The method of claim 12, further comprising using the mandrel tool to fabricate composite splice doublers for fastening the replacement panel to the component.

21. The method of claim 11, wherein fabricating the replacement panel further includes mounting a face sheet of the mandrel tool to a rotary support and counterbalancing the face sheet; using the rotary support to rotate the mandrel tool; and depositing fabric on the face sheet as the mandrel tool is being rotated.

22. The method of claim 21, wherein the rotary support includes a spindle; and wherein the counterbalancing includes attaching weights with spacers to the spindle; and verifying balance conditions are satisfied to ensure rotational equilibrium within capabilities of a machine that is used to deposit the fabric on the face sheet.

23. The method of claim 22, wherein the spindle has an adjustable length; and wherein mounting the mandrel tool includes varying length of the spindle to accommodate length of the mandrel tool.

24. The method of claim 1, wherein generating the design of the replacement panel includes identifying width of tape originally used in the damaged area; and applying a set of rules governing material laydown.

25. The method of claim 24, wherein the rules relate to deviations and defects from laying down tape at a given width.

26. The method of claim 24, wherein the rules also identify a plurality of fabrication cells that have capability to fabricate the replacement panel at different tape widths.

27. The method of claim 26, wherein the rules identify those fabrication cells that achieve a best balance between (1) laydown machine configuration and tape width; (2) engineering requirements for composite laminate balance and symmetry, (3) structural perFormance, (4) weight of the replacement panel; and (5) speed of manufacturing the replacement panel.

28. A method of repairing a damaged one-piece composite fuselage barrel section of an aircraft fuselage, the method comprising:
generating a design of a customized composite replacement panel for replacing a large damaged area of the barrel section, the designed panel including skin and integrated stiffening substructure;
fabricating the replacement panel according to the design;
fabricating fasteners for the replacement panel;
cutting damaged material from the damaged area, thereby leaving an opening in the barrel section; and
installing the fabricated panel in the opening, including using the fasteners to mechanically fasten the fabricated panel to the barrel section.

29. The method of claim 28, further comprising performing non-destructive inspection of the aircraft fuselage to determine location and extent of the damaged area.

30. The method of claim 29, wherein the non-destructive inspection is initiated upon receipt of a report indicating visible damage to the fuselage or a triggering action that might result in damage.

* * * * *